(12) United States Patent
Trinh

(10) Patent No.: US 11,608,889 B2
(45) Date of Patent: Mar. 21, 2023

(54) SHIFTING DEVICE

(71) Applicant: Ningbo Geely Automobile Research & Development Co., Ltd., Ningbo (CN)

(72) Inventor: Freddy Trinh, Gothenburg (SE)

(73) Assignee: Ningbo Geely Automobile Research & Development Co., Ltd., Ningbo (CN)

(*) Notice: Subject to any disclaimer, the term of this patent is extended or adjusted under 35 U.S.C. 154(b) by 186 days.

(21) Appl. No.: 16/990,741

(22) Filed: Aug. 11, 2020

(65) Prior Publication Data
US 2020/0370646 A1 Nov. 26, 2020

Related U.S. Application Data

(63) Continuation of application No. PCT/CN2019/071812, filed on Jan. 15, 2019.

(30) Foreign Application Priority Data

Feb. 21, 2018 (EP) .................................... 18157760

(51) Int. Cl.
*F16H 63/00* (2006.01)
*F16H 63/30* (2006.01)
(Continued)

(52) U.S. Cl.
CPC ........... *F16H 63/304* (2013.01); *F16H 25/20* (2013.01); *F16H 63/24* (2013.01); *F16H 2063/3063* (2013.01)

(58) Field of Classification Search
CPC ........ F16H 63/304; F16H 25/20; F16H 63/24; F16H 2063/3063; F16H 63/3043;
(Continued)

(56) References Cited

U.S. PATENT DOCUMENTS 4,179,944 A * 12/1979 Conner .................... H02K 7/06
 192/141
4,449,416 A * 5/1984 Huitema ............... F16H 63/304
 74/DIG. 7
(Continued)

FOREIGN PATENT DOCUMENTS

CN 2241645 Y 12/1996
CN 203463637 U 3/2014
(Continued)

OTHER PUBLICATIONS

International Search Report from corresponding International Patent Application No. PCT/CN2019/071812, dated Apr. 8, 2019, 2 pages.
(Continued)

*Primary Examiner* — Victor L MacArthur
(74) *Attorney, Agent, or Firm* — Tucker Ellis LLP

(57) ABSTRACT

A speed change device for shifting the gear of a transmission. The transmission includes a first shifter shaft, a first shifter element associated to the first shifter shaft and arranged for movement in an axial direction of the first shifter shaft for actuating a first set of gears. It further comprises a second shifter shaft and a second shifter element associated to the second shifter shaft and arranged for movement in an axial direction of the second shifter shaft for actuating a second set of gears. One of said first and second shifter shafts is hollow and the other of said first and second shifter shafts is partly arranged coaxially inside the hollow shaft.

8 Claims, 4 Drawing Sheets

(51) Int. Cl.
*F16H 25/20* (2006.01)
*F16H 63/24* (2006.01)

(58) Field of Classification Search
CPC ....... F16H 2063/025; F16H 2063/3079; F16H 2063/321
See application file for complete search history.

(56) References Cited

U.S. PATENT DOCUMENTS

| | | | | |
|---|---|---|---|---|
| 5,219,391 | A | * | 6/1993 | Edelen .................... F16H 61/32 74/403 |
| 5,689,997 | A | * | 11/1997 | Schaller ............... F16H 63/304 74/89.33 |
| 5,743,143 | A | * | 4/1998 | Carpenter ............... F16H 59/70 324/207.16 |
| 5,832,777 | A | * | 11/1998 | Weilant .................. F16H 63/24 74/335 |
| 6,810,762 | B2 | * | 11/2004 | Suzuki .................... F16H 61/32 74/335 |
| 7,166,049 | B2 | * | 1/2007 | Saller ....................... B60K 6/44 903/910 |
| 7,350,432 | B2 | * | 4/2008 | Somschor ............... F16H 61/32 74/335 |
| 8,627,739 | B2 | * | 1/2014 | Tooman ............. F16H 63/3023 74/473.36 |
| 2011/0126657 | A1 | * | 6/2011 | Ganter ................... F16H 61/12 74/473.12 |

FOREIGN PATENT DOCUMENTS

| | | |
|---|---|---|
| CN | 104343947 A | 2/2015 |
| CN | 205101493 U | 3/2016 |
| DE | 19920064 A1 | 11/2000 |
| DE | 102005039559 A1 | 3/2007 |
| DE | 102016108552 A1 * | 11/2017 |
| GB | 854079 A | 11/1960 |
| JP | 2002031229 A | 1/2002 |
| KR | 20150010214 A | 1/2015 |

OTHER PUBLICATIONS

European Search Report from corresponding European U.S. Appl. No. 18/157,760, dated Jul. 11, 2018, 2 pages.

* cited by examiner

SHIFTING DEVICE

RELATED APPLICATION DATA

This application is a continuation of International Application No. PCT/CN2019/071812, filed Jan. 15, 2019, which claims the benefit of European Patent Application No. 18157760.2, filed Feb. 21, 2018, the disclosures of which are incorporated herein by reference in their entireties.

TECHNICAL FIELD

The present invention relates to a speed change device for shifting the gear of a transmission, said transmission comprising a first shifter shaft, a first shifter element associated to the first shifter shaft and arranged for movement in an axial direction of the first shifter shaft for actuating a first set of gears, a second shifter shaft and a second shifter element associated to the second shifter shaft and arranged for movement in an axial direction of the second shifter shaft for actuating a second set of gears. The present invention also relates to a transmission having such a speed change device.

BACKGROUND

In the field of transmissions of manual type, today, mass-market automotive manual transmissions are nearly all at least 5-speed.

It has been widely anticipated that for electric vehicles (EVs), clutches and multi-speed gearboxes would not be required, as electric motors can drive the vehicle both forward and reverse from zero speed and typically operate over a wider speed range than combustion engines. Elimination of the gearbox represents a significant reduction in powertrain weight and complexity, and also removes a notable source of parasitic losses. The majority of first-generation consumer EVs have therefore been single-speed. However, current trends indicate that multi-speed gearboxes are likely to return for many future EVs. This allows the use of smaller, lower torque motors running at higher speeds to achieve both greater torque at the wheels for low speed tractive effort, and higher top road speed.

A dual-clutch transmission (DCT), sometimes referred to as a twin-clutch transmission or double-clutch transmission, is a type of automatic transmission or automated automotive transmission. It uses two separate clutches for odd and even gear sets. It can fundamentally be described as two separate manual transmissions with their respective clutches contained within one housing, and working as one unit.

Although usually operated in a fully automatic mode, many also have the ability to allow the driver to manually shift gears in semi-automatic mode, albeit still using the transmission's electrohydraulics.

Irrespective of if the transmission is used as automatic transmission or manual transmission from a driver point of view, some mechanisms are always present. There is an input shaft connected to a layshaft connected through meshed gears. The output shaft is also connected to the layshaft through meshed gears. The meshed gears could for the latter connection be varied using a collar usually splined to the output shaft but slidably arranged to move axially along the output shaft between two gear wheels. Normally, at least two or more sets with a collar and two meshed gears are arranged on the output shaft. This movement of the collar is actuated through a gear selector fork which in its simplest form is actuated directly with a gearstick operated by the driver.

For automated manual transmission or automatic transmission with a manual type transmission gearbox, the gear selector fork is actuated using hydraulics or an electric motor. However, most systems available are bulky.

SUMMARY

It is thus an object of the present invention to provide a speed change device for a transmission that requires less space than traditional solutions. This object is achieved with a speed change device according to the appended claims.

According to a first aspect of the present invention, there is provided speed change device for shifting the gear of a transmission, wherein said transmission comprises a first shifter shaft. It further comprises a first shifter element associated to the first shifter shaft and arranged for movement in an axial direction of the first shifter shaft for actuating a first set of gears. Also, a second shifter shaft and a second shifter element associated to the second shifter shaft and arranged for movement in an axial direction of the second shifter shaft for actuating a second set of gears is also provided. One of said first and second shifter shafts is hollow and the other of said first and second shifter shafts is partly arranged coaxially inside the hollow shaft.

By arranging one shaft within another shaft space is saved and the transmission could be made less bulky. Three or more shafts could be contemplated if required with the number of required hollow shafts then being one less than the total number of shafts. For instance, with three shafts at least two of them would have to be hollow and with four shafts at least three hollow etc.

According to one aspect of the disclosure at least one of the shifter shafts is provided with outer threads and connected via the threads to its shifter element, the shifter element having inner threads corresponding to the threads of the shaft such that the shifter element is actuated upon rotation of the shaft when in use.

Rotation of the shifter shaft requires no extra space when actuating the shifter element. Traditionally a shifter shaft actuates a fork by translational movement but this of course requires more space than if the shifter shaft would just rotate.

In a further aspect of the disclosure the shifter shafts are provided with outer threads and connected via the outer threads to the shifter elements, respectively, and wherein the shifter elements have corresponding inner threads such that the shifter elements are actuated upon rotation of the shafts when in use.

Again, if all shifter elements of the present speed change device are actuated by rotational movement of the shifter shaft, less space is required than actuating the shifter elements in the traditional way.

For the speed change device of the present disclosure when a shifter element is actuated by rotation of a shifter shaft, according to an aspect of the disclosure the speed change device comprises at least one electric motor for rotating at least one of the shafts.

The torque required to actuate the shifter element by rotating the shifter shaft is relatively low, i.e. a smaller electric motor can be utilized for this actuation. However, the electric motor should preferably have a fast response.

According to yet another aspect of the present disclosure, the electric motor is connected to the shafts via an actuator, the actuator having two operating positions, wherein in a first of these positions the electric motor is connected to one of the shafts and in a second position to the other shaft.

If both shifter shafts actuate their respective shifter element by rotation an actuator could be used to connect an electric motor to both shifter shafts.

According to one aspect of the present disclosure, a type of actuator for switching between the shifter shafts is a double clutch or dual clutch (sometimes also referred to as a twin clutch).

Again, the required torque that should be handled is low and thus the double clutch could preferably of a smaller kind and therefore not occupying much space.

For even faster action, according to one aspect of the present disclosure the speed change device comprises one electric motor for each shaft.

Instead of having one electric motor and one actuator such as a double clutch actuator for each two shifter shafts, one electric motor could be used for each shifter shaft.

For most cases the shifter element is a shifter fork or a shift fork. The purpose of the shifter fork is to move the sliders into engagement with each gear in a manual transmission.

Further, a transmission comprising a speed change device according to the above disclosure is provided.

Further features of, and advantages with, the present invention will become apparent when studying the appended claims and the following description. The skilled person realize that different features of the present invention may be combined to create embodiments other than the example embodiments described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
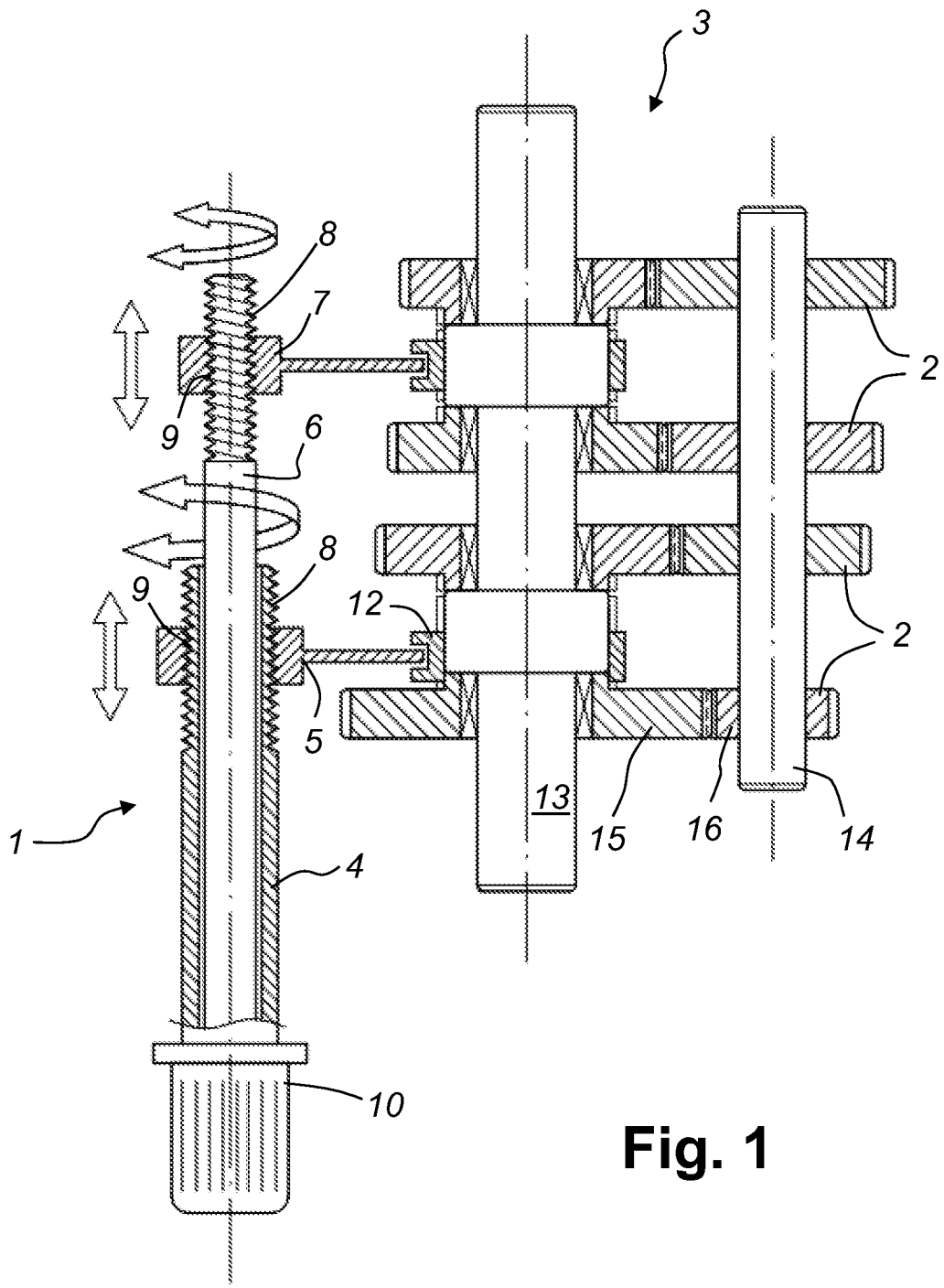
FIG. 1 is a cross-sectional view of an example embodiment of a speed change device in the context of gear wheels.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With reference to the example embodiment of FIG. 1, an example transmission 3 has a speed change device 1 for shifting the gear 2. The transmission 3 comprises a first shifter shaft 4, a first shifter fork 5 associated to the first shifter shaft and arranged for movement in an axial direction of the first shifter shaft 4 for actuating a first set of gears. The transmission 3 further comprises a second shifter shaft 6 and a second shifter fork 7 associated to the second shifter shaft 6 and arranged for movement in an axial direction of the second shifter shaft 6 for actuating a second set of gears. Said first shaft 4 is hollow and the second shifter shaft 6 is partly arranged coaxially inside the hollow shaft 4.

The shifter shafts 4, 6 are provided with outer threads 8 and connected via the outer threads to the shifter forks 5, 7, respectively. The shifter forks 5, 7 have corresponding inner threads 9 such that the shifter forks 5, 7 are actuated upon rotation of the shafts 4, 6 when in use.

In FIG. 1 the hollow shifter shaft 4 has been rotated such that its corresponding shifter fork 5 have moved the slider 12 and connected the main shaft 13 to the layer shaft 14 with the gear wheels 15, 16 lower most in the figure. The figure illustrates merely the concept of the current disclosure and therefore only shows a cut out of an example transmission.

Figure 2:
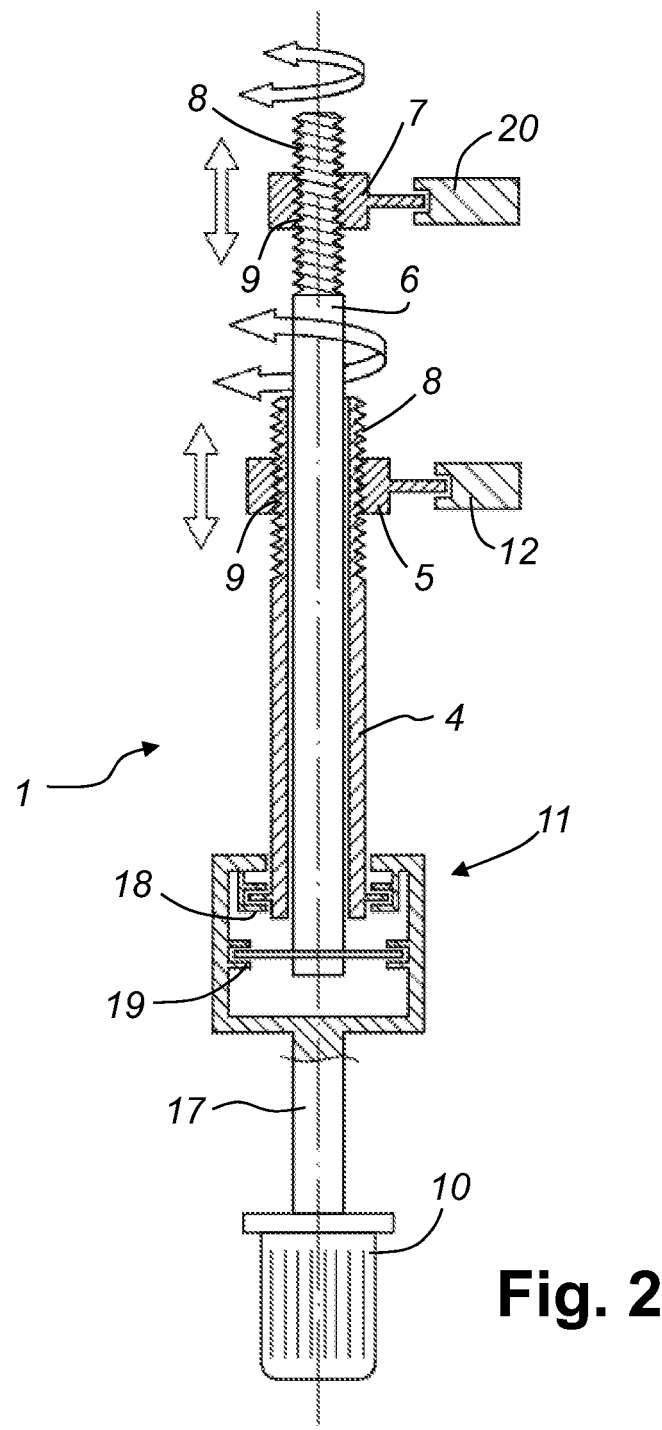
FIG. 2 is a cross-sectional view of an example embodiment of a speed change device.

Continuing to FIG. 2, the electric motor 10 is connected to the shafts 4, 6 via a double clutch 11, the double clutch 11 has two operating positions, wherein in a first of these positions the electric motor 10 is connected to one of the shafts and in a second position to the other shaft.

The electric motor 10 rotates the input shaft 17 connected to the double clutch 11. When the top most clutch 18 in the figure is connected to the input shaft 17, the hollow shifter shaft 4 can be activated and thus move the shifter fork 5 and the corresponding slider 12 up or down, depending on the direction of rotation of the input shaft 17 rotated by the electric motor 10. Similarly, when the lower most clutch 19 in the figure is connected to the input shaft 17, the other shifter shaft 6 coaxially arranged inside the hollow shifter shaft 4 can be activated. The shifter fork 7 and the corresponding slider 20 can thus be moved up or down depending on the direction of rotation of the input shaft 17 rotated by the electric motor 10.

Figure 3:
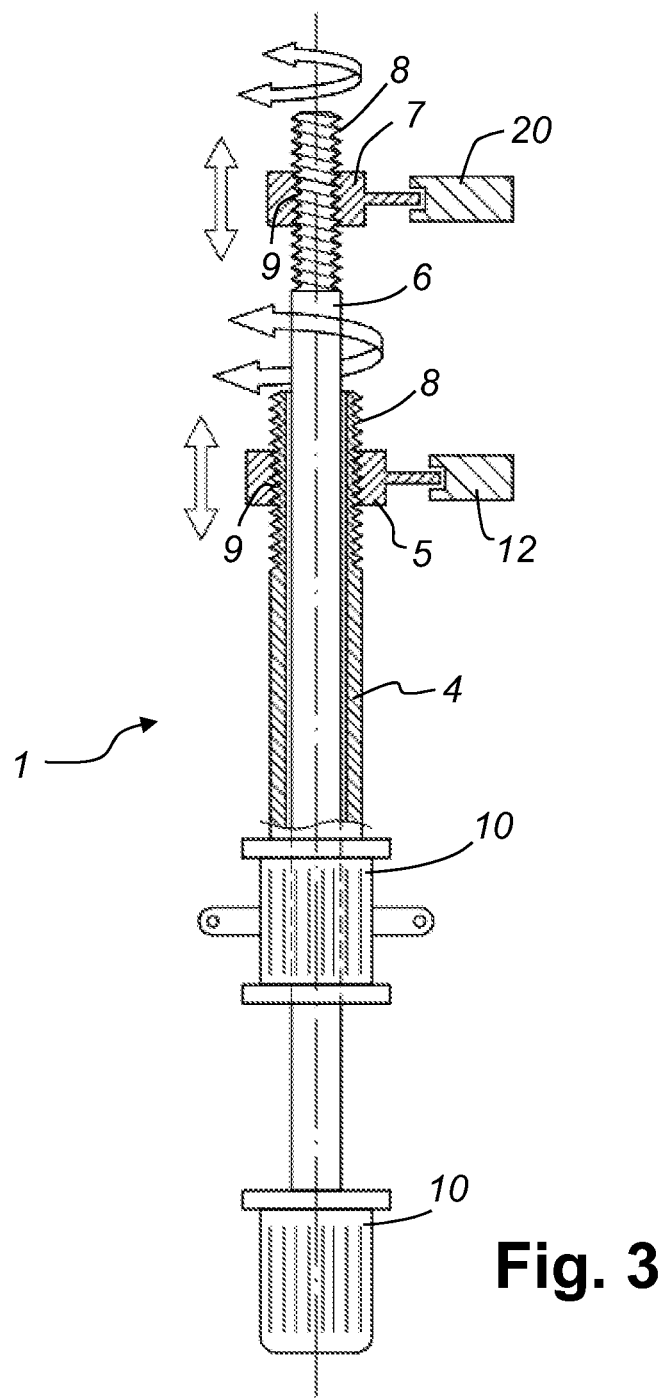
FIG. 3 is a cross-sectional view of further example embodiment of a speed change device.

Turning now to FIG. 3, two electric motors 10 are shown, each rotating one shaft. The upper most electric motor 10 in the figure rotates the hollow shifter shaft 4 whereas the lower most electric motor 10 rotates the shifter shaft 6 arranged coaxially inside the hollow shifter shaft 4. When the shifter shaft 4 is rotated the shifter fork 5 and corresponding slider 12 is moved up or down depending on the direction of rotation of the shifter shaft 4. Likewise, when the shifter shaft 6 is rotated the shifter fork 7 and the corresponding slider 20 is moved up or down depending on the direction of rotation of the shifter shaft 6.

Figure 4:
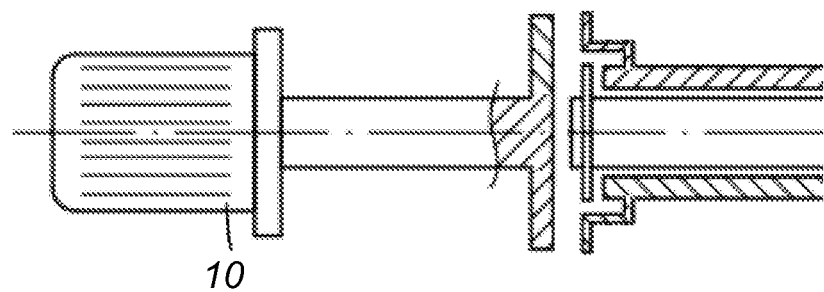
FIG. 4 is a cross-sectional view of an alternative actuator.
Figure 5:
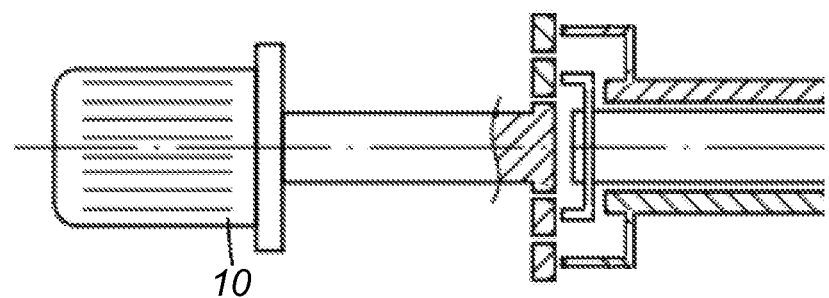
FIG. 5 is a cross-sectional view of yet an alternative actuator.

Going back to the principle shown in FIG. 3 with one electric motor 10 and one actuator, the actuator type or clutch type in this example is a principle sketch of a plate clutch. However, there are further possibilities as can be seen in FIGS. 4 and 5. In FIG. 4 the actuator is a dog clutch. FIG. 5 illustrates a planetary gear solution as actuator.

It is to be understood that the present invention is not limited to the embodiments described above and illustrated in the drawings; rather, the skilled person will recognize that many changes and modifications may be made within the scope of the appended claims. For example, there could be more than two shifter shafts, e.g. three shifter shafts, obviously at least two of them being hollow.

A further possibility would be a combination of the examples shown in FIGS. 2 and 3. The shifter shaft 6 in FIG. 3 could instead of actuating the shifter fork 7 be utilized as the input shaft 17 in FIG. 2. In other words two electric motors and one double clutch would then be able to actuate three shifter shafts and accordingly three shifter forks with their corresponding sliders.

The invention claimed is:

1. A transmission comprising:
   a first shifter shaft;

a first shifter element associated to the first shifter shaft and arranged for movement in an axial direction of the first shifter shaft for actuating a first set of gears;

a second shifter shaft; and a second shifter element associated to the second shifter shaft and arranged for movement in an axial direction of the second shifter shaft for actuating a second set of gears, wherein one of said first and second shifter shafts is hollow and the other of said first and second shifter shafts is partly arranged coaxially inside the hollow shaft, and wherein the first and second shifter shafts are configured to be moveable independently from each other for providing selective motion of the first and second shifter elements.

2. The transmission according to claim 1, wherein at least one of the shifter shafts is provided with outer threads and connected via the threads to its shifter element, the shifter element having inner threads corresponding to the threads of the shaft such that the element is actuated upon rotation of the shaft when in use.

3. The transmission according to claim 2, further comprising at least one electric motor for rotating at least one of the shafts.

4. The transmission according to claim 3, wherein the electric motor is connected to the shafts via an actuator, the actuator having two operating positions, wherein in a first of these positions the electric motor is connected to one of the shafts and in a second position to the other shaft.

5. The transmission according to claim 4, wherein the actuator is a double clutch.

6. The transmission according to claim 2, further comprising one electric motor for each shaft.

7. The transmission according to claim 1, wherein the shifter shafts are provided with outer threads and connected via the outer threads to the shifter elements, respectively, and wherein the shifter elements have corresponding inner threads such that the shifter elements are actuated upon rotation of the shafts when in use.

8. The transmission according to claim 1, wherein the shifter element is a shifter fork.

* * * * *